United States Patent [19]

Onishi

[11] Patent Number: 5,359,485
[45] Date of Patent: Oct. 25, 1994

[54] MAGNETIC HEAD HAVING A TOOTHED CORE STRUCTURE OF A LAMINATE TYPE

[75] Inventor: Masahiro Onishi, Kofu, Japan

[73] Assignee: TDK Corporation, Tokyo, Japan

[21] Appl. No.: 912,775

[22] Filed: Jul. 13, 1992

[30] Foreign Application Priority Data

Jul. 20, 1991 [JP] Japan .............................. 3-064665[U]

[51] Int. Cl.$^5$ ............................................ G11B 5/265
[52] U.S. Cl. .................... 360/121; 360/122; 360/126
[58] Field of Search ............... 360/121, 122, 126, 125, 360/103, 102; 29/603

[56] References Cited

U.S. PATENT DOCUMENTS

| 4,191,980 | 3/1980 | King et al. ............ | 360/122 |
| 4,367,505 | 1/1983 | Stromsta et al. ........ | 360/121 |
| 4,831,481 | 5/1989 | Toyoshima ............. | 360/121 |

FOREIGN PATENT DOCUMENTS

| 62-22212 | 1/1987 | Japan ................. | 360/121 |
| 62-22214 | 1/1987 | Japan ................. | 360/121 |
| 4-53006 | 2/1992 | Japan ................. | 360/122 |
| 2098378 | 11/1982 | United Kingdom ........ | 360/125 |

Primary Examiner—John H. Wolff
Assistant Examiner—Craig A. Renner
Attorney, Agent, or Firm—Oblon, Spivak, McClelland, Maier, & Neustadt

[57] ABSTRACT

The magnetic head according to this invention comprises a core lamination structure which includes a recording/reproducing head and erase heads laminated on both sides of the recording/reproducing head, the end faces of the recording/reproducing head and the erase heads in the advance direction of the magnetic recording medium being formed as sloped surfaces not perpendicular to the laminated surface of the core lamination structure, and sliders which hold and fix the core lamination structure from both sides thereof. When the core lamination structure is to be held and fixed with sliders on its both sides, the ridges of the sloped surfaces are abutted on the reference surface of jigs which are used for lamination of the heads to correctly position the recording/reproducing head and the erase heads and to thereby facilitate setting of a precise interval distance between the magnetic gap for recording/reproducing and the gaps for erasing. This greatly improves the characteristics as well as increases the yield of production.

5 Claims, 6 Drawing Sheets

MAGNETIC HEAD HAVING A TOOTHED CORE STRUCTURE OF A LAMINATE TYPE

BACKGROUND OF THE INVENTION

1. Field of the Invention

This invention relates to a magnetic head for recording/reproducing information on a magnetic medium, and more particularly to a floppy head which is incorporated in a floppy disk drive device used, for instance, as an external memory of a computer.

2. Discussion of the Background

As a magnetic head used for the floppy disk drive of an external memory of a computer, a magnetic head 31 of laminate type shown in FIGS. 4 and 5 is typically used. The magnetic head 31 has a core lamination structure 32 as a magnetic head core which is held from both sides with a pair of sliders 34A and 34B made of nonmagnetic ceramics and the like. The components of the magnetic head 31 are fixed integrally with a known resin, glass, and the like. The core structure 32 comprises a pair of erase heads 36A and 36B laminated on both sides of a relatively wide recording/reproducing head 35. The bottoms of these sliders 34A and 34B, and the core lamination structure 32 form a sliding surface opposing a magnetic recording medium 46 such as a floppy disk, and a pair of sliding rails 37A and 37B are formed on the bottoms thereof on both sides of a groove 45 extending in the advance direction 47 of the medium 46. The core lamination structure 32 is exposed on one of the rails 37A at the same plane. As shown in FIG. 5, each of the recording/reproducing head 35 and the erase heads 36A and 36B of the core lamination structure 32 comprises a magnetic core member 38 formed with an I-type core piece and an L-type core piece and a nonmagnetic reinforcing member 39 of ceramics and the like which is fixed on the side of said I-type core piece and doubles as a spacer. The magnetic cores 38 of the pair of erase heads 36A and 36B are situated at a position upstream the magnetic core 38 of the recording/reproducing head 35 in the advance direction 47 of the magnetic recording medium 46. With said I-type core piece and L-type core piece, a magnetic gap Gr for recording/reproducing is formed on the magnetic core member 38 of the head 35, and magnetic gaps Ge for erasing are formed on respective magnetic cores 38 of the erase heads 36A and 36B. The gap Gr is separated from the gaps Ge by an interval distance L in the advance direction 47 of the medium 46. As the distance L between the gaps determines the characteristics of a magnetic head 31 at the stage of manufacture, it is most critical to control the distance L.

In the manufacture of magnetic heads of laminated type mentioned above, the method shown in FIG. 6 is usually employed to position the recording/reproducing head 35, erase heads 36A and 36B of the core lamination structure 32 and sliders 34A and 34B in order to set the interval distance L between the gaps. According to this method, bottom surfaces of the recording/reproducing head 35, erase heads 36A and 36B forming the core structure 32 and sliders 34A and 34B are aligned on a reference surface (not shown) by means of a jig, and pressed perpendicularly to the laminated surfaces, from the direction shown with an arrow Y in the figure. Then, the core structure 32 and the sliders 34A and 34B are held from both sides thereof by a fixed jig 43A and a movable jig 43B, and pressed in the direction marked with an arrow X by the movable jig 43B so as to align one end each of the respective components with a reference surface 50 of the jig 43A. As the end surfaces of the recording/reproducing head 35 and of erase heads 36A and 36B in the advance direction 47 of the magnetic medium 46 are formed on a plane perpendicular to the lamination of the core structure 32, the core components are positioned by contacting the respective end surfaces with the reference alignment surface 50 of the fixed jig 43A. Subsequently, the core lamination structure 32 and the sliders 34A and 34B are fixed integrally with one another with resin or glass. A gimbal 40 made of a thin elastic metal plate and the like is fixed on the upper surface of the magnetic head 31 as shown in FIG. 4. A coil 41 is mounted on the core lamination structure 32 which projects through the gimbal 40. A back core 42 is provided on the recording/ reproducing head 35 projecting from the coil 41. The gimbal 40 is connected to a drive (not shown) for changing the position of said magnetic head 31 relative to the magnetic recording medium.

In the magnetic head positioned as above, the interval distance between the gaps determined at the time of manufacture of the magnetic head is critical to the characteristics thereof. Therefore, the respective components should be positioned at a higher precision so as to set the interval distance L between the gaps precisely. As described above, the distance L between the gaps is determined by contacting one end each of the respective component heads 35, 36A and 36B with the reference alignment surface 50 of the jig. But when a foreign matter such as dust or a torn piece of the core should enter between the end surfaces of the respective components and said reference surface, said end surfaces would deviate from said reference surface, and as a result, the distance L between the gaps becomes different from the predetermined value to inconveniently lower the dimensional precision of said core lamination structure, cause defects, and decrease the yield.

SUMMARY OF THE INVENTION

This invention aims to obviate the aforementioned defects encountered in the prior art and to provide a magnetic head in which respective component heads of a core lamination structure are positioned precisely with ease, and which is high in dimensional accuracy and yield.

Accordingly, this invention provides a magnetic head comprising sliders fixed on both sides of a core lamination structure which includes a recording/reproducing head and erase heads laminated on both sides of the recording/ reproducing head, which is characterized in that at least one end face each of the respective recording/reproducing heads and of said erase heads form a plane which is not perpendicular to the laminated surfaces of said core lamination structure, and said recording/reproducing head and said erase heads are so laminated that the tip edge lines of said end faces are aligned along the same plane.

More preferably, according to this invention, both end faces of the recording/reproducing head and the erase heads form a plane respectively, each of which is not perpendicular to the laminated surfaces of said core lamination structure and the tip edge lines of one of the end faces are positioned and aligned with one another on the same plane when the heads are laminated.

According to this invention, erase heads are laminated on both sides of a recording/reproducing head to form a core lamination structure, and the core lamination structure is held between non-magnetic sliders. End faces of said recording/reproducing head and said erase heads in the advance direction of the medium form a plane which is not perpendicular to the laminated surfaces, so that said end faces of those heads will have pointed edges. By causing the pointed edge lines to abut against the reference alignment surface of a fixed jig and pressing the heads toward the fixed jig via a pressing surface of a movable jig, the heads are accurately aligned along the reference surface. As the edges of said recording/ reproducing and erase heads abut against the reference surface and the pressing surface of the jig linearly, even if a tiny foreign article adheres on the reference surface or on the pressing surface, it is unlikely for the article to enter between the edges and the reference surface, and hence, said heads would not be separated or deviated from said reference surface in the advance direction of the recording medium when they are laminated.

BRIEF DESCRIPTION OF THE DRAWINGS

This invention will now be described in more detail referring to preferred embodiments and attached drawings thereof.

DESCRIPTION OF THE PREFERRED EMBODIMENTS

Figure 1:
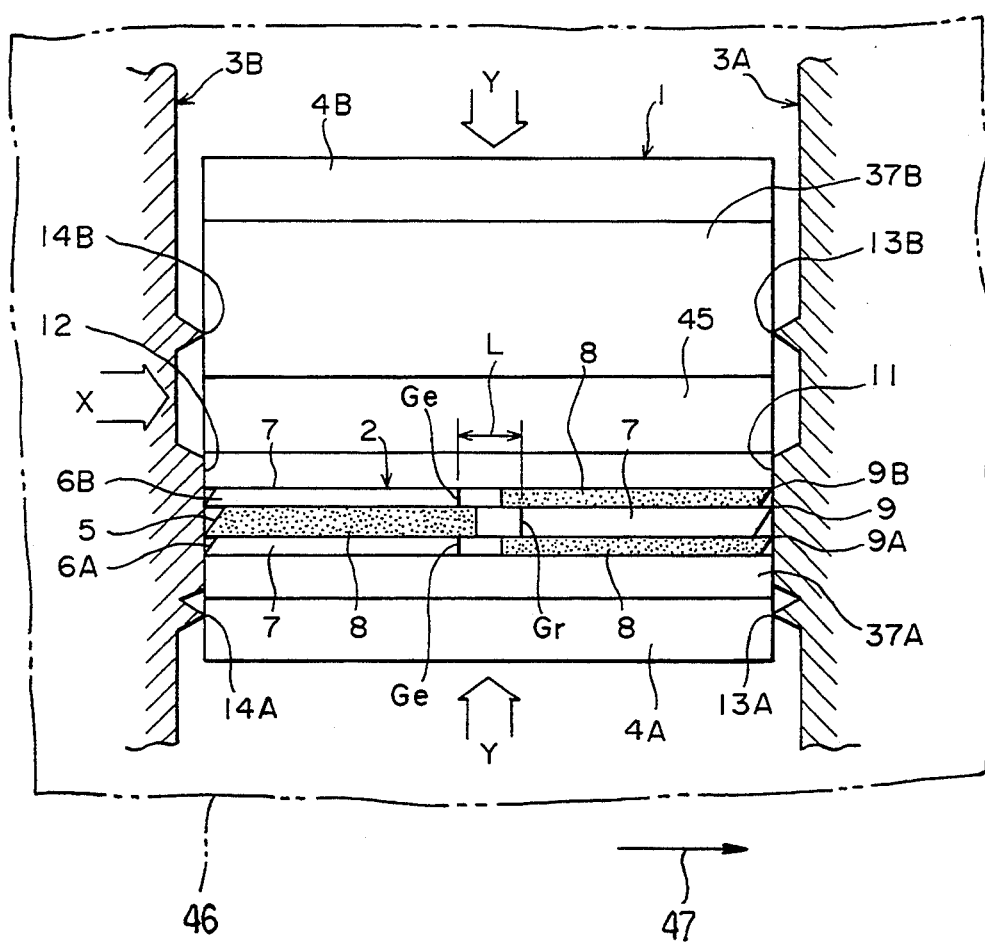
FIG. 1 is a bottom view to show the positioning of a magnetic head of laminate type at the time of manufacture of an embodiment of this invention, when viewed from the sliding surface.
Figure 4:
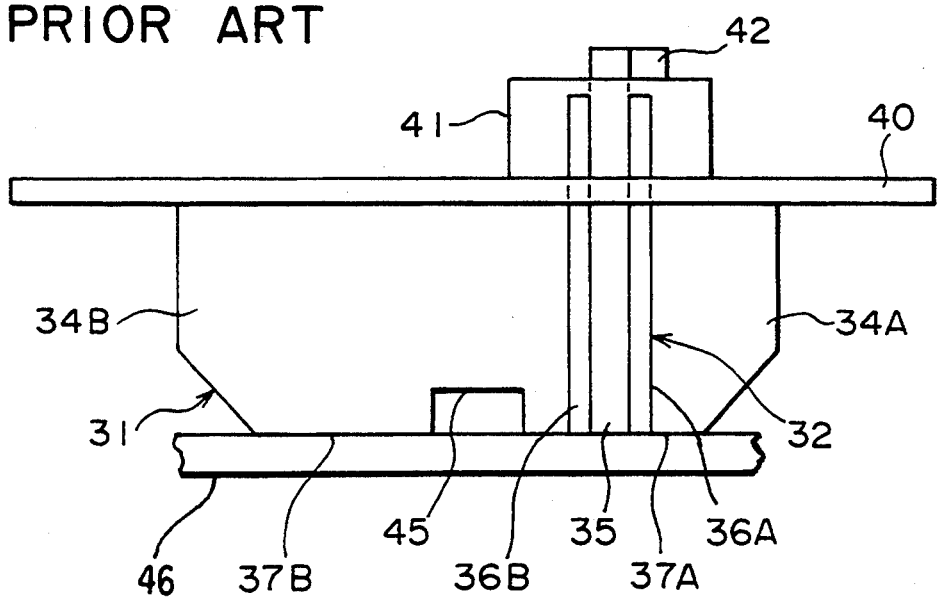
FIG. 4 is a side view to show a conventional magnetic head of laminate type when assembled.
Figure 5:
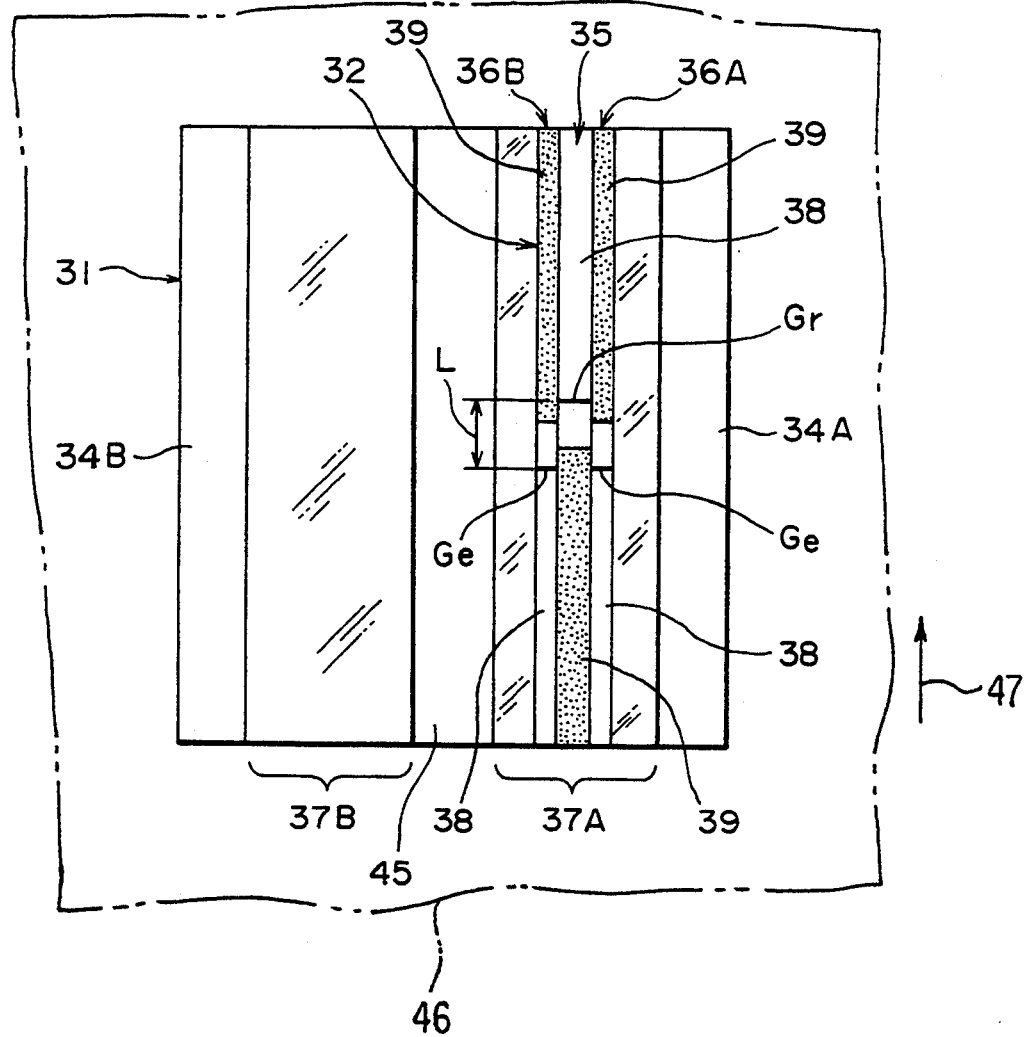
FIG. 5 is a bottom view to show a prior art magnetic head of laminate type when viewed from the sliding surface.
Figure 6:
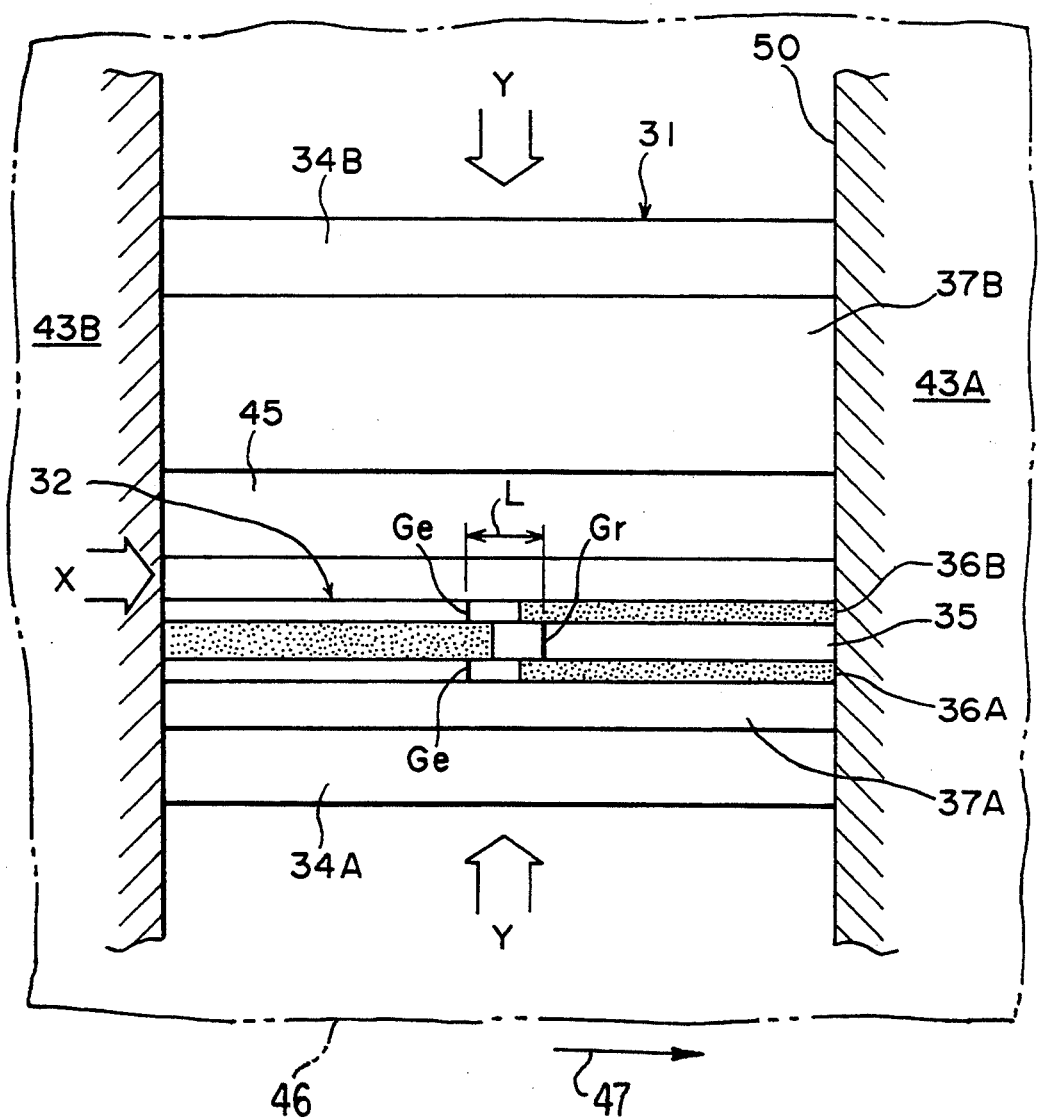
FIG. 6 is a bottom view to show the positioning of a prior art magnetic head of laminate type at the time of manufacture.

Referring now to FIG. 1, a magnetic head 1 has a core lamination structure 2 as a magnetic head core which is held from both sides by a pair of sliders 4A and 4B made of non-magnetic ceramics and the like. The components of the magnetic head 1 are fixed integrally with resin or glass under the above mentioned state. The core lamination structure 2 comprises a relatively wide recording/ reproducing head member 5 and a pair of erase heads 6A and 6B of the same shape which are laminated on both sides of the head member 5. As mentioned in relation to FIGS. 4 and 5, the bottom surfaces of these sliders 4A and 4B together with the core lamination structure 2 form a sliding surface opposing a magnetic recording medium 46. A pair of sliding rails 37A and 37B are formed on the bottom surface thereof. The core lamination structure 2 is exposed on one of the rails 37A at the same plane. The recording/reproducing head 5 and the erase heads 6A and 6B comprise respectively a magnetic core member 7 having a magnetic gap and a non-magnetic reinforcing member 8 which doubles as a spacer. In this embodiment, the gap Gr of the recording/reproducing head 5 and the gaps Ge of the erase heads 6A and 6B extend perpendicularly to the laminated surfaces of the core lamination structure 2. As shown in the figure, the gap Gr is positioned downstream the gap Ge in the advance direction 47 of the recording medium 46 for the length of the interval distance L.

Both end faces of the recording/reproducing head 5 and of erase heads 6A and 6B form a tooth-like shaped surface each which is not perpendicular to the laminated surface, and tooth-like ridges thereof 9, 9A and 9B are formed on a line which is perpendicular to the sliding surface of the magnetic head 1 opposing the magnetic recording medium. The sloped surfaces of the heads 5, 6A and 6B may be shaped individually by a cutting means and the like prior to lamination so that the distances between the ridge 9 and the gap Gr and between the ridges 9A, 9B and the gap Ge are accurately determined. Alternatively, the sloped surface of the heads 5, 6A and 6B may be formed by cutting the side of a core block having parallel side surfaces in an oblique manner mentioned hereinafter in relation to FIG. 2A.

Figure 2A:
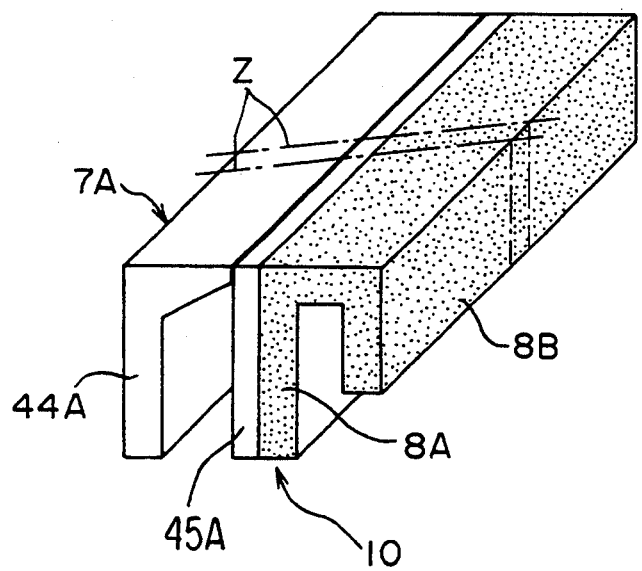
FIG. 2A is a perspective view of a core block to show the state of cutting out a recording/reproducing core member or an erase core member of a magnetic head according to another embodiment of this invention.
Figure 2B:
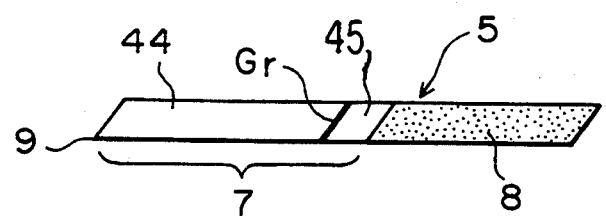
FIG. 2B is a bottom view of the recording/reproducing core member or the erase core member cut out from the core block shown in FIG. 2A.
Figure 2C:
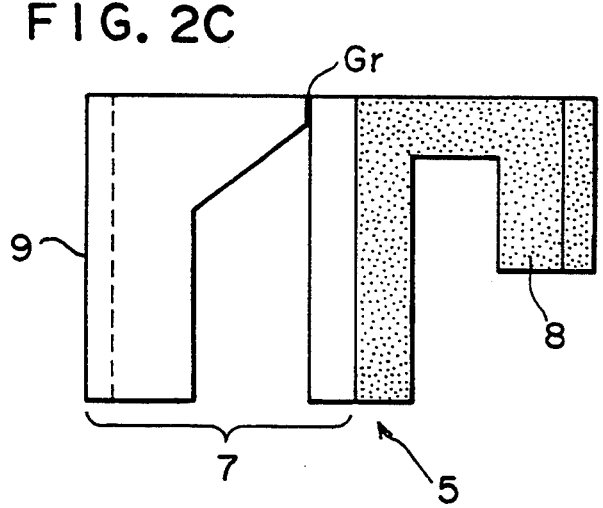
FIG. 2C is a front view to show the recording/ reproducing core member or the erase core member cut out from the core block shown in FIG. 2A when viewed from the direction perpendicular to the laminated surfaces.

Referring to FIG. 2A, an I-core bar 45A having a section of letter I and an L-core bar 44A having a section of letter L are connected to form an elongated core bar 7A. A non-magnetic reinforcing member 8A is attached onto the side of the I-core bar of the core bar 7A to form an elongated core block 10 having parallel side surfaces. By simply cutting the core block 10 in a manner not perpendicular to the side surface 8B as illustrated by the dot-and-chain line Z in FIG. 2A, the recording/reproducing head member 5 having a sloped end surface in respect of the cut surface, as shown in FIG. 2B in plan view and in FIG. 2C in frontal view, can be obtained easily with a fewer steps. The reference numeral 7 denotes a magnetic core member, and 8 a non-magnetic reinforcing member. In this embodiment the gap Gr for recording/reproducing which is formed at the junction of the I-core 45 and the L-core 44 extends obliquely in respect of said cut surface. The erase heads may be manufactured similarly.

Referring again to FIG. 1, a fixed jig 3A and a movable jig 3B respectively have vertical surfaces which are at least wider than the width of the core lamination structure 2. The vertical surface of the fixed jig 3A is perpendicular to the bottom surface of the magnetic head 1 and has a reference surface 11 for positioning. The vertical surface of the movable jig 3B is also perpendicular to the bottom surface of the magnetic head 1 and has a surface 12 for pressing the cores. At the positions where sliders 4A and 4B are located, there are provided reference edges 13A and 13B on the fixed jig 3A and pressing edges 14A and 14B on the movable jig 3B at least at one location respectively. The reference edges 13A and 13B and pressing edges 14A and 14B are so formed that their ridges are perpendicular. The reference edges 13A and 13B are on the same plane as the core positioning reference surface 11 while the pressing edges 14A and 14B are on the same plane as the core pressing surface 12. The core positioning reference surface 11 of the fixed jig 3A and the reference edges 13A and 13B are formed rigid in order to maintain the reference surface stable. The core pressing surface 12 of the movable jig 3B and pressing edges 14A and 14B are made slightly elastic in order to absorb variations in the length of the heads 5, 6A and 6B.

Description will now be made to setting of the gap interval L, lamination and positioning of the core lamination structure 2 of the magnetic head 1. First, component members of the core lamination structure 2 such as the recording/reproducing head 5, erase heads 6A and 6B and sliders 4A and 4B are aligned on their bottom surfaces by means of a jig (not shown) against a reference surface and applied with a pressure in the lamination direction as shown with the arrow Y. While the heads 5, 6A and 6B of the core lamination structure 2 are in line contact with the reference surface 11 of the fixed jig 3A at the respective tip end 9, 9A, 9B thereof, the sliders 4A and 4B are in line contact with the reference edges 13A and 13B of the fixed jig 3A on their end surfaces. Then the heads 5,6A and 6B and the sliders 4A and 4B are pressed on the end surfaces on the other side with the movable jig 3B in the direction marked with the arrow X. Thus the head 5, the pair of erase heads 6A, 6B and the sliders 4A and 4B are positioned along the same plane formed by the reference surface 11 and the ridges of the edges 13A and 13B of the jig 3A. Then, the heads 5, 6A and 6B and the sliders 4A and 4B are fixed integral using resin or glass to form the magnetic head 1 of laminate type.

Because the ridge 9, 9A and 9B of the end surfaces of the recording/reproducing head 5 and erase heads 6A and 6B of the core lamination structure 2 in the advance direction of a recording medium are in line contact with the reference surface 11, the ridges 9, 9A and 9B of the respective head members on one side may be positioned along the same plane and laminated to form the core lamination structure 2. Even if a foreign article is adhered on the surface 11, it is least likely for the article to enter between the edges 9, 9A or 9B and the reference surface 11. Therefore, the gap interval L can always be set precisely, and at the same time, the sliders 4A and 4B may be correctly positioned on the same plane as the reference surface 11. Even if a portion of She ridges 9, 9A or 9B should chip, as each of them forms a perpendicular line, there will be no problem in positioning. Moreover, even if the length of the heads 5, 6A and 6B, and sliders 4A and 4B may vary, the end surfaces of the heads and the sliders on the side of the fixed jig 3A can be aligned with the reference 11 by virtue of the elasticity of the movable jig 3B. So long as the distances the gaps Gr and Ge to the ridges 9, 9A and 9B are set correctly, accurate positioning may be effected irrespective of other variations.

Figure 3:
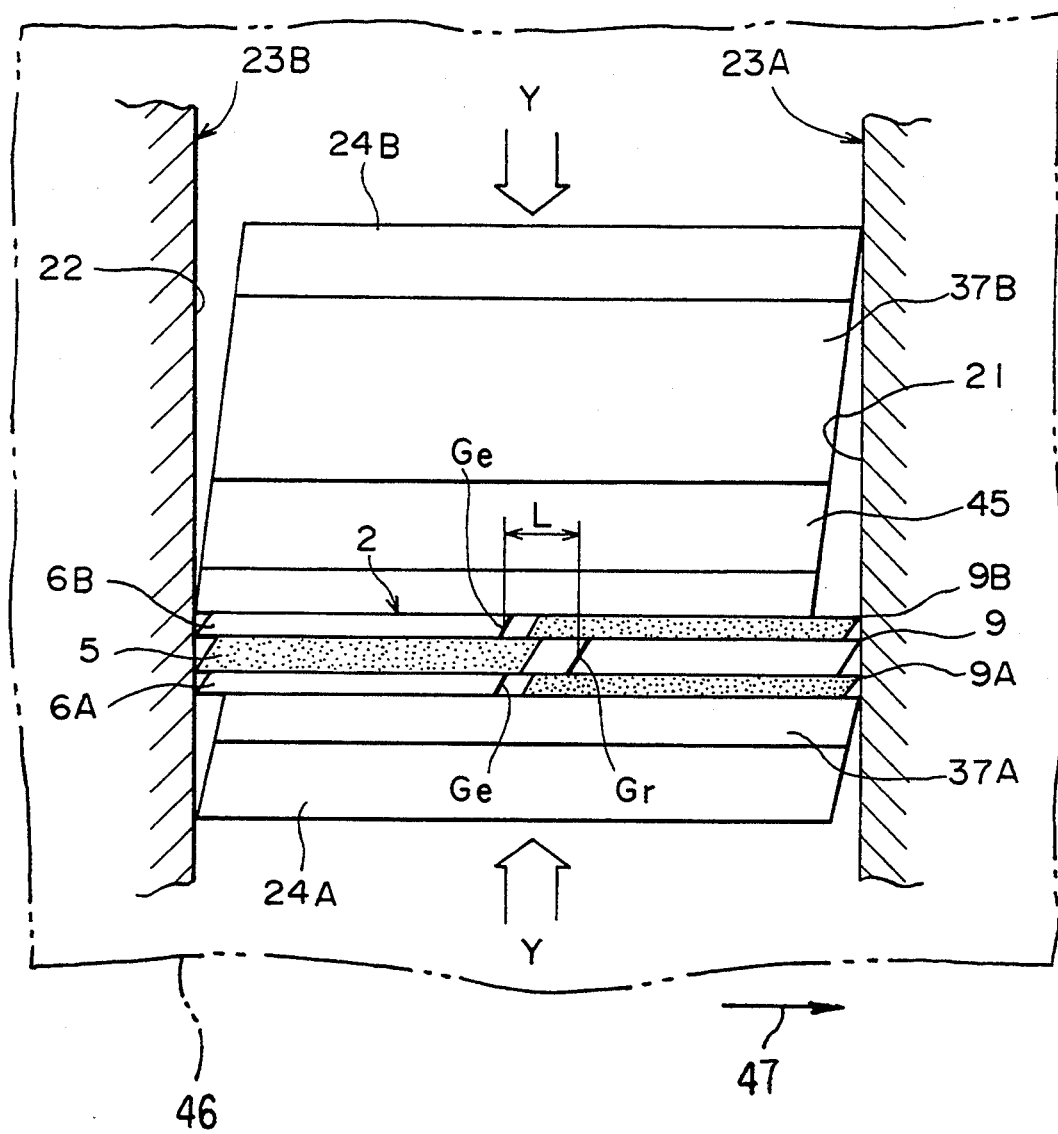
FIG. 3 is a bottom view to show the state of positioning of the magnetic head of laminate type using the recording/reproducing core member and the erase core members cut out from the core block shown in FIG. 2A.

FIG. 3 shows another embodiment made by diagonally cutting a core block 10 shown in FIG. 2A to form a recording/reproducing head 5, and erase heads 6A and 6B, and laminating them to form a core lamination structure 2. End surfaces of the sliders 24A and 24B in the advance direction 47 of the magnetic recording medium 46 are so formed that they are not perpendicular to the lamination surface similarly as the head members 5, 6A and 6B. Further, the reference surface 21 of the fixed jig 23A and the pressing surface 22 of the movable jig 23B are respectively formed as a continuous plane. Similarly to the embodiment explained in relation to FIG. 1, while the core lamination structure 2 and the sliders 24A and 24B are being pressed in the lamination direction, the ridges 9, 9A and 9B of the head members 5, 6A and 6B and the ridges of the sliders 24A and 24B are arranged in line contact with the reference surface 21 and the pressing surface 22 respectively, and pressed with the movable jig 23B to align the heads members 5, 6A and 6B on the surface 21. In the embodiment shown in FIG. 3, no special manufacturing steps are required to form said ridges, which is advantageous cost-wise. In this embodiment, the gaps Gr and Ge are sloped toward the lamination surface and are parallel to the end surfaces of the heads 5, 6A and 6B, so that the distance L between the gaps are precisely secured when the ridges 9, 9A and 9B of the respective heads are aligned.

In any of the above mentioned embodiments, coils or back cores may be mounted in a manner similar to the prior art. Although the both end surfaces of the recording/ reproducing head 5 and erase heads 6A and 6B are formed as surfaces that are not perpendicular to the lamination surfaces, the end surfaces on the side where the head members abut against the reference surface of the fixed jig may be formed as oblique surfaces having ridges. It is obvious that all such modifications and alternations are within the scope of this invention.

What is claimed is:

1. A magnetic head comprising:
   a core lamination structure which comprises a recording/reproducing head and erase heads laminated on both sides of the recording/reproducing head and sliders fixed on both sides of the core lamination structure, said recording/reproducing head and said erase heads being laminated in a direction perpendicular to a travel direction of a magnetic medium, wherein at least one end surface of each of said recording/reproducing head and said erase heads is formed as a plane which is not perpendicular to a laminated surface of said core lamination structure so as to define tooth-like ridges which extend in the travel direction of the magnetic medium, and said recording/reproducing head and said erase heads are laminated in a manner to align said tooth-like ridges of said non-perpendicular end surfaces on a same plane which is perpendicular to said laminated surface.

2. The magnetic head as claimed in claim 1, wherein the end surfaces on one side of said recording/reproducing head and erase heads in the travel direction of the magnetic recording medium are each formed as a sloped surface which is not perpendicular to the laminated surface of said core lamination structure.

3. The magnetic head as claimed in claim 1, wherein end surfaces on both sides of said recording/reproducing head and erase heads in the travel direction of the magnetic recording medium and a direction opposite to the travel direction of the magnetic recording medium are formed as sloped surfaces which are not perpendicular to the laminated surface of said core lamination structure.

4. The magnetic head as claimed in any one of the claims 1 through 3, wherein a magnetic gap of said recording/reproducing head and gaps of said erase heads are formed perpendicular to the laminated surface of said core lamination structure.

5. The magnetic head as claimed in claim 3, wherein a magnetic gap of said recording/ reproducing head and gaps of the erase heads are formed parallel to said sloped surface of said recording/ reproducing head and said sloped surfaces of said erase heads.

* * * * *